United States Patent [19]

Hattori

[11] Patent Number: 5,532,792
[45] Date of Patent: Jul. 2, 1996

[54] PRINTING APPARATUS WITH IMMEDIATE INTERRUPT

[75] Inventor: Yuji Hattori, Nagoya, Japan

[73] Assignee: Brother Kogyo Kabushiki Kaisha, Nahoya, Japan

[21] Appl. No.: 423,870

[22] Filed: Apr. 18, 1995

[30] Foreign Application Priority Data

Apr. 20, 1994 [JP] Japan .................................. 6-106105

[51] Int. Cl.⁶ .................................................. G03G 15/00
[52] U.S. Cl. ........................................ 355/206; 395/113
[58] Field of Search ................................ 355/205, 206, 355/207; 395/113, 116; 358/296, 300

[56] References Cited

U.S. PATENT DOCUMENTS 5,018,081  5/1991  Yamaguchi et al. .................... 395/113

*Primary Examiner*—Joan H. Pendegrass
*Attorney, Agent, or Firm*—Oliff & Berridge

[57] ABSTRACT

In a control system for a laser printer, an AND gate is connected to a circuit system extending from a DC controller circuit to a driving circuit for a laser diode. A mask signal of "L" level is output from the port OPM of the DC controller circuit to the AND gate when a print stop key on an operation panel is switched on. Thereby, the print operation of a print mechanism is immediately stopped. This efficient method of interrupting printing prevents toner from being wasted on a printing error and allows immediate interruption when a printing error is discovered.

20 Claims, 3 Drawing Sheets

PRINTING APPARATUS WITH IMMEDIATE INTERRUPT

BACKGROUND OF THE INVENTION

1. Field of the Invention

The present invention relates to a printing apparatus.

2. Description of Related Art

In a conventional laser printer capable of performing a print operation at a high speed, print data such as document data or image data are received from external equipment such as a host computer or a personal computer to develop the print data into printable bit image data. The developed bit image data are stored into a print image buffer. Then, a laser beam corresponding to bit image data of one raster read out from the print image buffer is emitted from a laser diode to perform a main scanning operation, thereby forming an electrostatic latent image on a photosensitive drum for every dot line. Thereafter, toner is attached to the electrostatic latent image on the photosensitive drum and then transferred onto a recording sheet. The toner on the recording sheet is heated by a fixing heater of a fixing device to fix the toner on the recording sheet, thereby completing a print process. This type of laser print is equipped with an operation panel. The operation panel is provided with setting keys and setting switches for setting various modes on the print process and a print stop key for enforcedly stopping the print process. When the print stop key is manipulated during the print process, the recording sheet under print process remains in the printer, and thus there is a high possibility of a sheet jam occurring. Therefore, in order to prevent a sheet jam, the print process on a current sheet (a page under print process) that is currently being subjected to the print process is completed, and the print sheet is discharged. The print process on subsequent sheets (pages) is enforcedly stopped.

However, usually in this type of laser printer, a user does not manipulate the print stop key to enforcedly stop the print process until the user checks the print content on a recording sheet that has been subjected to the print process and discharged to the outside of the laser printer and finds an error in the print content. Therefore, when the user checks the print content on a printed recording sheet discharged from the laser printer, decides to stop the print process and then manipulates the print stop key, the process of forming an electrostatic latent image on the photosensitive drum is continued to the end for a sheet (one page) under the print process when the print stop key is manipulated. Thus, printing is finished for that sheet even after the print stop key is manipulated. Accordingly, the print process is conducted on the sheet (one page) under print even after the manipulation of the print stop key, and thus the toner is wasted. Particularly when an image having a large print area is printed on a sheet by erroneously inputting incorrect print data, a large amount of toner is attached onto an electrostatic latent image on the photosensitive drum contrary to a user's intention even after the user discovers the error. Thus, a large amount of expensive toner is wasted.

SUMMARY OF THE INVENTION

A primary object of the present invention is to provide a print apparatus capable of immediately stopping a print operation of a print mechanism in response to a print stop instruction to thereby prevent toner from being wasted.

To attain the above and other objects, a print apparatus of the present invention includes a print mechanism comprising a charging mechanism for uniformly charging the surface of a photosensitive drum, an exposure mechanism for selectively exposing to light the surface of the photosensitive drum on which an electrostatic latent image is formed, a transfer mechanism for transferring toner attached to the electrostatic latent image on the photosensitive drum to a recording medium supplied from a sheet supply portion and a fixing mechanism for heating the toner transferred to the recording medium by the transfer mechanism to thereby fix the toner onto the recording medium. A print stop instruction mechanism instructs the stop of a page-by-page print operation of the print mechanism, and a print inhibiting mechanism immediately stops the print operation of the print mechanism when receiving a print stop instruction from the print stop instruction mechanism.

In the print apparatus as described above, the print inhibiting mechanism is designed to inhibit the electrostatic latent image from being formed on the photosensitive drum. Therefore, after the print stop instruction is input, the print operation is immediately stopped by inhibiting the formation of the electrostatic latent image.

In the print apparatus as described above, the print inhibiting mechanism is designed to inhibit the light exposure on the photosensitive drum by the exposure mechanism. Therefore, after the print stop instruction is input, no toner is attached onto the photosensitive drum. Thus, the print operation can be immediately stopped.

In the print apparatus according to the present invention, the print mechanism has the charging mechanism, the exposure mechanism, the transfer mechanism and the fixing mechanism, and the fixing means. The surface of the photosensitive drum is uniformly charged by the charging mechanism, and then the surface of the photosensitive drum on which the electrostatic latent image is to be formed is exposed to light by the exposure mechanism. Thereafter, the toner, which is attached to the electrostatic latent image on the photosensitive drum, is transferred onto the recording medium supplied from the sheet supply portion by the transfer mechanism and then thermally fixed onto the recording medium by the fixing mechanism.

The print stop instruction mechanism outputs an instruction to stop the page-by-page print operation of the print mechanism. The print inhibiting mechanism stops the print operation of the print mechanism immediately upon receiving a print stop instruction from the print stop instruction mechanism.

As described above, in the print apparatus of the present invention, the print inhibiting mechanism is provided to stop the print operation of the print mechanism immediately when the print stop instruction is input thereto from the print stop instruction mechanism. Therefore, after the print stop instruction is input, no electrostatic latent image is formed on the photosensitive drum. As a result, the print operation on a sheet (page) under print at the time when the print stop instruction is output is prevented from being subsequently continued even after the print stop instruction is output. Thereby, the toner is prevented from being wasted. So, the toner consumption amount can be saved.

BRIEF DESCRIPTION OF THE DRAWINGS

Preferred embodiments of the present invention are described in detail with reference to the following figures wherein.

DETAILED DESCRIPTION OF PREFERRED EMBODIMENTS

Preferred embodiments according to the present invention are described with reference to the accompanying drawings.

The preferred embodiment relates to a case where the present invention is applied to a laser printer for receiving print data from external equipment to store the print data in memory and for printing print data on a recording sheet.

Figure 1:
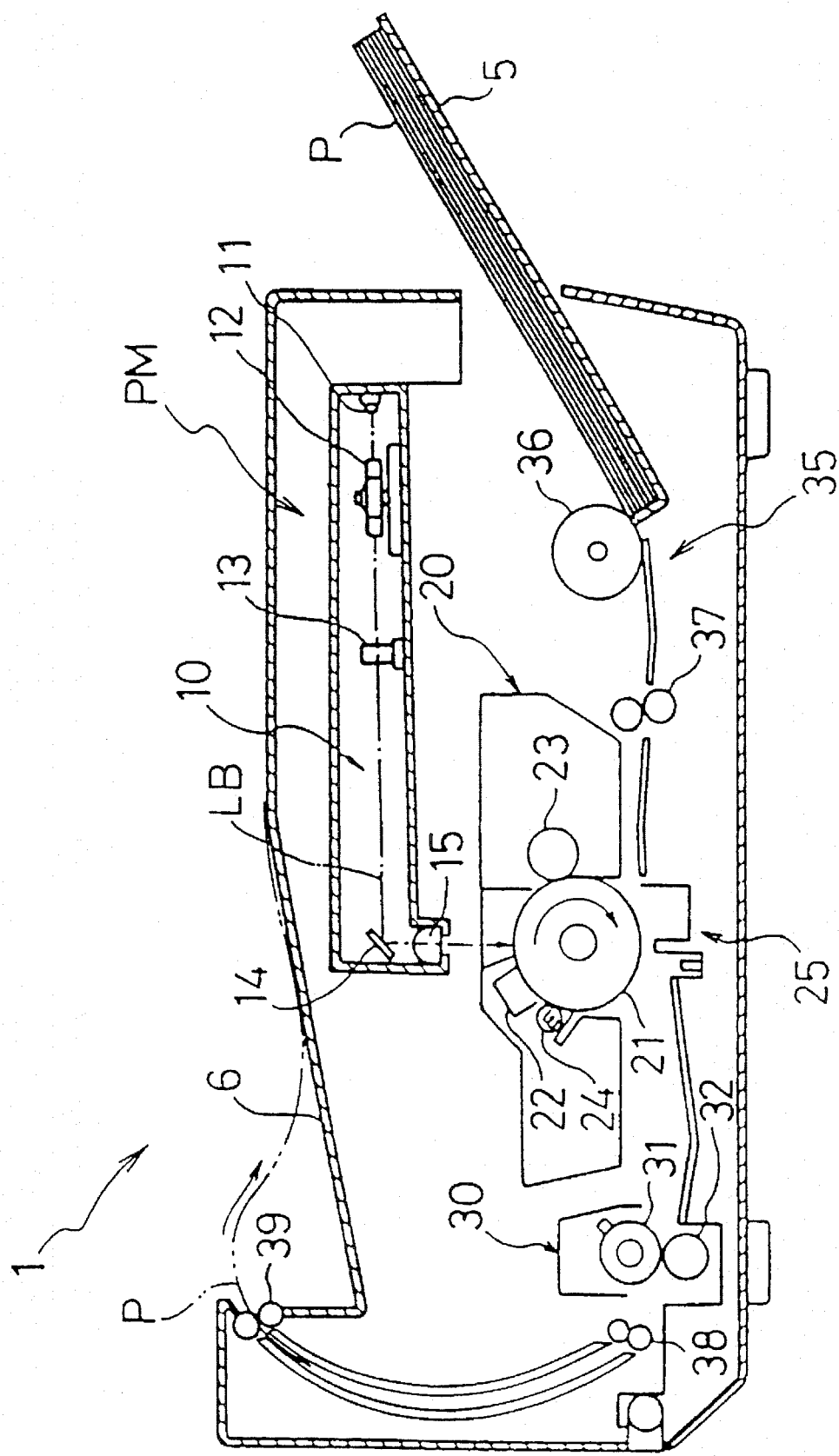
FIG. 1 is a side view showing a laser printer of an embodiment of the present invention.

First, a print mechanism PM provided on the laser printer 1 is briefly described with reference to FIG. 1. The laser printer 1 comprises a laser scanner 10, a process cartridge 20, and a transfer/separation device 25 including a transfer charger and a discharge probe. A fixing device 30 has a fixing roller 31 and a press roller 32, and a feed mechanism 35 has a sheet roller 36, a resist roller 37, a feed roller 38, and a discharge roller 39.

The laser scanner 10 is equipped with a laser diode 11, a hexagonal mirror 12, a focusing lens 13, a reflection mirror 14, and a lens member 15 of synthetic resin. The process cartridge 20 contains a photosensitive drum 21, a primary charger 22, a development cylinder 23 and an exposure lamp 24.

First, the surface of the photosensitive drum 21 is uniformly charged by the primary charger 22. Thereafter, a laser beam LB is emitted from the laser diode 11 to the hexagonal mirror 12, which rotates at a fixed high speed, and is deflected by each mirror surface of the hexagonal mirror 12 at a prescribed angle to thereby perform a main scanning operation in a prescribed angular range. The deflected laser beam LB is passed through the focusing lens 13, reflected from the reflection mirror 14 downwardly, passed through the lens member 15 and then irradiated onto the photosensitive drum 21 to form an electrostatic latent image. The electrostatic latent image formed on the photosensitive drum 21 is developed with toner supplied from the development cylinder 23.

Through the action of the transfer/separation device 25, this visible image (toner image) is transferred to a recording sheet P, which is fed from the sheet supply cassette 5 by the feed mechanism 35. Thereafter, the recording sheet P having the toner image is heated by the fixing device 30 to fix the toner onto the recording sheet P and is then fed onto a sheet discharge tray 6 by the feed roller 38 and the sheet discharge tray 6.

Next, the control system of the laser printer 1 will be described with reference to the block diagram of FIG. 2. The control system hardware is basically identical to that of a conventional laser printer. Thus, it is briefly described.

Figure 2:
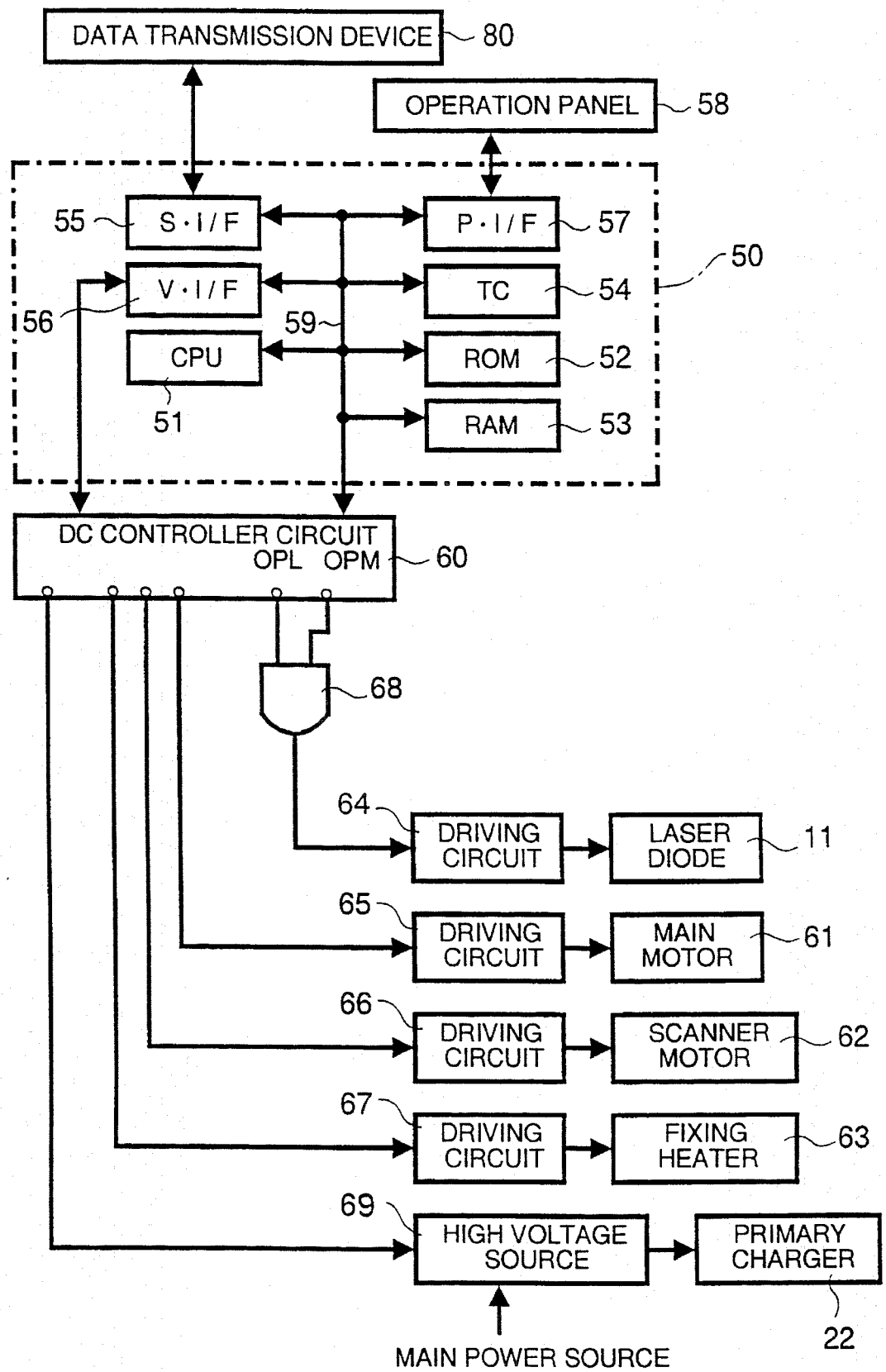
FIG. 2 is a block diagram showing a control system for the laser beam.

As seen in FIG. 2, video controller 50 of the laser printer 1 includes a CPU 51, a ROM 52 in which various control programs are stored, a RAM 53 having various memories such as a reception buffer for receiving and storing transmission data transmitted from an external data transmission equipment 80 such as a personal computer, a host computer or the like, and a timing control circuit (TC) 54 for producing a timing signal for timing when the reception data are written or read from the reception buffer. The video controller 50 also includes a serial interface (S-I/F) 55 for receiving the transmitted print data, a video interface (V-I/F) 56, which has two scan buffers of 4 Kbytes and serves to successively output to a DC controller circuit 60 print information converted to bit image data, and a panel interface (P-I/F) 57 for receiving a signal from an operation panel 58. Each of the elements as described above are connected through a bus 59 to the CPU 51.

The output port of the DC controller circuit 60 is connected to a driving circuit 65 for a main motor 61 for driving the photosensitive drum 21 and the feed mechanism 35, a driving circuit 66 for a scanner motor 62 for driving the hexagonal mirror 12, and a driving circuit 67 for a fixing heater 63 provided to the fixing roller 31.

The driving circuit 64 for the laser diode 11 is connected to the output terminal of an AND gate 68. One input terminal of the AND gate 68 is connected to a port OPL for outputting a laser driving signal of the DC controller circuit 60, and the other input terminal of the AND gate 68 is connected to a port OPM for outputting a mask signal for inhibiting production of the laser driving signal. That is, when "H" (high) level is output at the mask signal output port OPM, the laser driving signal is supplied from the laser driving signal output port OPL to the driving circuit 64. On the other hand, when "L" (low) level is output at the mask signal output port OPM, the supply of the laser driving signal to the driving circuit 64 is stopped. That is, the production (emission) of the laser beam LB is inhibited.

A high voltage source 69 for applying a voltage of several KV is connected to the primary charger 22. The high voltage source 69 comprises a well-known transformer or the like. Application of the voltage to the primary charger 22 is performed in accordance with the output of the DC controller circuit 60 based on a control signal from the CPU 51.

The operation panel 58 is provided with plural display lamps such as a "READY" display lamp for indicating a reception possible state, an "ALARM" display lamp for indicating, for example, occurrence of an error during print process and also plural setting keys such as a "release key" for releasing the error, a line switching key for switching between on-line and off-line and a "print stop key" for enforcedly stopping the print process. In the ROM 52, various control programs are prestored for a normal laser printer, and also a font memory is stored with dot pattern data on many characters such as characters, symbols, a memory management program for managing the memory capacity and head address of respective memories such as a reception data buffer and a print image memory, and a control program for performing a laser emission (generation) inhibiting control, which is inherent to the present invention as described.

Figure 3:
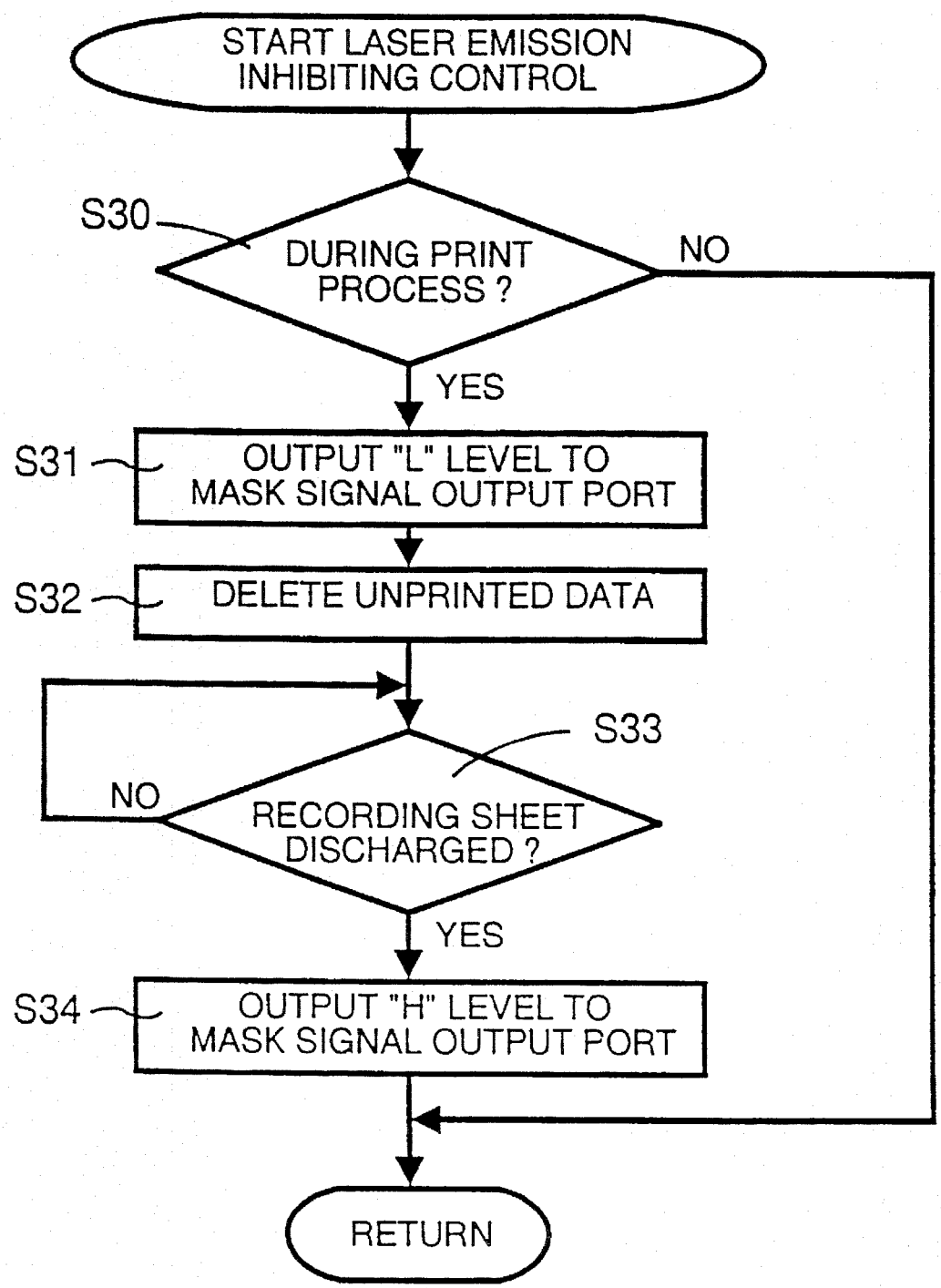
FIG. 3 is a flowchart for a laser beam emission inhibiting control routine.

Next, the laser emission inhibiting control routine that is executed in the video controller 50 of the laser printer 1 is described with the flowchart of FIG. 3. In FIG. 3, reference character Si (i=30, 31, 32, . . . ) represents each step.

This control routine is started when the "print stop key" on the operation panel 58 is manipulated to output a print stop signal. If no print process is executed (S30: NO), the control routine is immediately finished, and the process returns to a main routine.

On the other hand, if the print process is executed (S30: YES), the "L" level is output at the mask signal output port OPM (S31), and print data that have not been printed because the print process is partially completed and thus remains in the RAM 53 are deleted (S32). Therefore, when the next data are supplied and printed to carry out the print process again, the previous (remaining) print data that have not been printed due to the stop of the print process can be prevented from being printed together with the next print data.

When the "L" level is output at the mask signal output port OPM (S31), the laser driving signal from the laser driving signal output port OPL is not supplied to the driving circuit 64. As a result, the emission (occurrence) of the laser beam BL is inhibited, and the exposure operation is inhibited. So, the formation of the electrostatic latent image on the photosensitive drum 21 is stopped in the middle of the print process as described above. Therefore, in the subsequent development process, only a partial electrostatic latent image, which is partially formed on the photosensitive drum, is developed with the toner supplied from the development cylinder 23. Thereafter, this visible toner image (halfway image) is transferred onto the recording sheet that is fed from the sheet supply cassette 5 by the feed mechanism 35. The recording sheet P having the toner image is fed onto the sheet discharge tray 6 by the feed roller 38 and the sheet discharge roller 39 while the toner on the recording sheet P is thermally fixed onto the recording sheet P by the fixing device 30. That is, the recording sheet P is discharged while having been partially printed.

Thereafter, when the recording sheet P is discharged to the sheet discharge tray 6 (S33: YES), the "H" level is output at the mask signal output port OPM (S34), and this control routine is finished to return to the main routine. Accordingly, when the print process is subsequently started again, the laser driving signal from the laser driving signal output port OPL is supplied to the driving circuit 64.

As described above, according to the laser printer of this embodiment, when the print stop key is manipulated, the emission of the laser beam LB is inhibited simultaneously with the reception of the print stop signal. So, the formation of the electrostatic latent image on the photosensitive drum 21 is stopped. Therefore, the toner for the development process is not superfluously attached to the photosensitive drum 21 on which no electrostatic latent image is formed, so that the toner can be prevented from being wasted.

The AND gate 68 is shown as being provided just in front of the driving circuit 64. However, it may be provided to a video signal line to which a video signal is output from the video interface 56. Furthermore, a development voltage to be supplied to the development cylinder 23 or a charge voltage to be supplied to the transfer charger of the transfer/separation device 25 may be controlled to prevent the toner on the photosensitive drum 21 from being transferred to the recording sheet P.

This invention is not limited the above embodiments, and various modifications may be made to the respective devices and control operations of the above embodiments on the basis of an existing technique or a technique obvious to a skilled person in the art without departing from the subject matter of the present invention. Furthermore, the present invention is applicable to a printer, a copying machine, a facsimile machine, etc., which is equipped with an exposure device other than a laser scanner, such as an LED, an LCD or the like.

What is claimed is:

1. A printing device that prints an image on a substrate comprising;

a feeding mechanism that feeds a substrate through the printing device along a feed path;

a memory that stores print data corresponding to the image to be printed;

a charged image recording surface disposed in the feed path and a charging device coupled to the image recording surface to charge the image recording surface;

an image forming device coupled to the memory that forms a latent image based on the stored print data on the charged image recording surface;

a developing device disposed in the feed path adjacent to the image recording surface that develops the latent image with toner;

a controller coupled to the feeding mechanism, the memory, the charging device, the image forming device, and the developing device, wherein the controller controls driving signals that drive the feeding mechanism, the charging device, the image forming device, and the developing device during printing; and a stop printing signal controller coupled to the controller for selectively outputting a stop printing signal to the controller during printing to stop the driving signal to at least one of the charging device, the image forming device, and the developing device to immediately interrupt printing.

2. The printing device of claim 1 wherein the controller deletes the remaining print data in the memory in response to the stop printing signal.

3. The printing device of claim 1 wherein the controller controls the feeding mechanism to discharge the substrate during printing in response to the stop printing signal.

4. The printing device of claim 1 wherein the controller stops the driving signal in response to the stop printing signal by outputting a low level mask signal to inhibit production of the driving signal.

5. The printing device of claim 1 further comprising an AND gate coupled to the controller and having one input terminal for receiving a driving signal from the controller and another input terminal for receiving a mask signal from the controller, wherein the controller outputs mask signals of different levels to allow and inhibit the driving signals.

6. The printing device of claim 1 wherein the image forming device is a laser emitting device that forms an electrostatic latent image by irradiating a laser beam onto the charged image recording surface based on the print data of the image.

7. The printing device of claim 6 wherein the controller stops the driving signal to the laser emitting device in response to the stop printing signal to stop formation of the latent image.

8. The printing device of claim 1 wherein the controller stops the driving signal to the image forming device in response to the stop printing signal.

9. The printing device of claim 1 wherein the stop printing signal stops a page-by-page print operation.

10. A printing apparatus comprising:

a photosensitive drum having a surface;

charging means coupled to the photosensitive drum for uniformly charging the surface of the photosensitive drum;

exposure means for selectively exposing the surface of the photosensitive drum in accordance with print data and for forming an electrostatic latent image based on the print data on the surface of the photosensitive drum with toner;

transferring means for transferring the toner attached to the surface of the photosensitive drum according to the electrostatic latent image to a recording medium;

fixing means for heating the toner transferred to the recording medium by said transfer means to thereby fix the toner onto the recording medium;

print stop instruction means for outputting an instruction to stop a page-by-page print operation; and control means for controlling a print operation coupled to said charging means, said exposure means, said transferring means, and said print stop instruction means, and including print inhibiting means for immediately stopping the print operation upon receiving a print stop instruction from said print stop instruction means.

11. The printing apparatus of claim 10, wherein said print inhibiting means inhibits said exposure means from forming the electrostatic latent image on said photosensitive drum.

12. The printing apparatus of claim 11, wherein said print inhibiting means inhibits said exposure means from exposing the photosensitive drum to a laser beam.

13. The printing apparatus of claim 10 further comprising:

storing means for storing print data transferred from an external device, and wherein said control means further includes deleting means for deleting print data from said storing means that has not been printed on a recording medium when the print stop instruction is output by said print stop instruction means.

14. The printing apparatus of claim 10 further comprising feed means coupled to said control means for feeding the recording medium through the printing apparatus during the printing operation to have an image formed thereon, wherein said control means controls said feed means to output the recording medium during the printing operation immediately upon receiving the print stop instruction.

15. The printing apparatus of claim 10 wherein the control means comprises a DC controller circuit that supplies driving signals to said charging means, said exposure means, said transferring means, and said fixing means.

16. The printing apparatus of claim 15 wherein said control means further comprises an AND gate connected to said DC controller circuit, wherein said DC controller circuit also outputs mask signals of different levels to allow and inhibit the output of the driving signals in response to the print stop instruction.

17. The printing apparatus of claim 16 wherein said AND gate is connected between said DC controller circuit and said exposure means to inhibit formation of the electrostatic latent image when a print stop instruction is output.

18. A method of controlling printing of an image, comprising the steps of:

initiating a printing process, including transferring print data of the image to be printed to a RAM and supplying a driving signal to an image forming device to form an image based on the print data;

outputting a print stop signal;

outputting a low level mask signal to stop the driving signal from being supplied to the image forming device;

deleting the print data from the RAM; and outputting a high level mask signal to allow the driving signal to be supplied to the image forming device in order to continue printing.

19. The method of claim 18 wherein the step of initiating the printing process comprises the step of supplying a recording medium for the image to be printed on, and wherein the method further comprises the step of discharging the recording medium that was being printed on when the stop signal was output prior to the step of outputting the high level mask signal.

20. The method of claim 18 wherein the step of initiating the printing process includes forming an electrostatic latent image with a laser beam emitted in response to a laser driving signal, and wherein the step of outputting a low level mask signal to stop the driving signal from being supplied to the image forming device includes stopping the laser driving signal to thereby inhibit emission of the laser beam and formation of the electrostatic latent image.

* * * * *